(12) United States Patent
Nomura et al.

(10) Patent No.: US 11,510,130 B2
(45) Date of Patent: Nov. 22, 2022

(54) CAR-LOADED COMMUNICATION APPARATUS, IN-CAR COMMUNICATION SYSTEM, COMMUNICATION METHOD AND PROGRAM

(71) Applicant: NEC COMMUNICATION SYSTEMS, LTD., Tokyo (JP)

(72) Inventors: Takumi Nomura, Tokyo (JP); Tetsuji Kawatsu, Tokyo (JP); Katsuyuki Akizuki, Tokyo (JP); Yuji Harada, Tokyo (JP); Akira Matsumoto, Tokyo (JP); Yuki Baba, Tokyo (JP)

(73) Assignee: NEC COMMUNICATION SYSTEMS, LTD., Tokyo (JP)

( * ) Notice: Subject to any disclaimer, the term of this patent is extended or adjusted under 35 U.S.C. 154(b) by 81 days.

(21) Appl. No.: 17/050,182

(22) PCT Filed: Apr. 24, 2019

(86) PCT No.: PCT/JP2019/017400
§ 371 (c)(1),
(2) Date: Oct. 23, 2020

(87) PCT Pub. No.: WO2019/208624
PCT Pub. Date: Oct. 31, 2019

(65) Prior Publication Data
US 2021/0112482 A1  Apr. 15, 2021

(30) Foreign Application Priority Data
Apr. 25, 2018 (JP) .............................. JP2018-083799

(51) Int. Cl.
*H04W 40/24* (2009.01)
*H04W 4/48* (2018.01)
(Continued)

(52) U.S. Cl.
CPC ........... *H04W 40/246* (2013.01); *H04L 12/40* (2013.01); *H04W 4/48* (2018.02); *H04W 40/20* (2013.01);
(Continued)

(58) Field of Classification Search
CPC ..... H04W 40/246; H04W 4/48; H04W 40/20; H04W 40/28; H04L 12/40; H04L 2012/40215; H04L 2012/40273
See application file for complete search history.

(56) References Cited

U.S. PATENT DOCUMENTS 10,103,780 B1 * 10/2018 Laifenfeld ............. H04B 3/542
10,542,481 B2 *  1/2020 Soundararajan ........ H04W 4/40
(Continued)

FOREIGN PATENT DOCUMENTS

JP  2007-150927 A  6/2007
JP  2008-219599 A  9/2008
(Continued)

OTHER PUBLICATIONS

International Search Report for PCT/JP2019/017400 dated Jun. 4, 2019 (PCT/ISA/210).

*Primary Examiner* — Chandrahas B Patel
(74) *Attorney, Agent, or Firm* — Sughrue Mion, PLLC (57) ABSTRACT

A car-loaded communication apparatus comprises: an acquisition part; and a selection part. The acquisition part acquires car information related to a state of a car in which a communication network is constructed inside, or an environment in which the car is placed. The selection part selects a communication route of a flow accommodating a transmission packet(s) from a plurality of communication routes included in the communication network, based on: the car
(Continued)

information; and communication route information related to a communication route(s) included in the communication network.

18 Claims, 8 Drawing Sheets

(51) Int. Cl.
  *H04L 12/40* (2006.01)
  *H04W 40/20* (2009.01)
  *H04W 40/28* (2009.01)
(52) U.S. Cl.
  CPC ... *H04W 40/28* (2013.01); *H04L 2012/40215* (2013.01); *H04L 2012/40273* (2013.01)

(56) References Cited

U.S. PATENT DOCUMENTS

| | | | |
|---|---|---|---|
| 11,026,120 B2* | 6/2021 | Khoryaev | H04W 72/082 |
| 11,197,188 B2* | 12/2021 | Baek | H04W 28/0215 |
| 2019/0108160 A1 | 4/2019 | Otsuka et al. | |
| 2020/0210167 A1 | 7/2020 | Ogawa et al. | |

FOREIGN PATENT DOCUMENTS

| | | | |
|---|---|---|---|
| JP | 2011-239348 A | 11/2011 | |
| JP | 2012-129780 A | 7/2012 | |
| JP | 2014-36423 A | 2/2014 | |
| JP | 2014-113952 A | 6/2014 | |
| JP | 2015-154287 A | 8/2015 | |
| JP | 2017199229 A | 11/2017 | |
| JP | 2019-36855 A | 3/2019 | |

\* cited by examiner

COMMUNICATION ROUTE INFORMATION

| ROUTE | NUMBER OF HOPS | LINE SPEED |
|---|---|---|
| ROUTE B | 3 | 1 |
| ROUTE C | 2 | 5 |

FIG.4B

| CAR INFORMATION | ROUTE B | ROUTE C |
|---|---|---|
| NORMAL DRIVING | 1 | 1 |
| EMERGENCY | 10 | 0 |
| ... | ... | ... |

| ROUTE | NUMBER OF HOPS | LINE SPEED | SUM | PRIORITY |
|---|---|---|---|---|
| A | 2 | 1 | 3 | 1 |
| B | 2 | 5 | 7 | 3 |
| C | 3 | 1 | 4 | 2 |
| D | 4 | 5 | 9 | 4 |

CAR-LOADED COMMUNICATION APPARATUS, IN-CAR COMMUNICATION SYSTEM, COMMUNICATION METHOD AND PROGRAM

DESCRIPTION OF RELATED APPLICATION

This application is a National Stage of International Application No. PCT/JP2019/017400 filed Apr. 24, 2019, claiming priority based on Japanese Patent Application No. 2018-083799 filed Apr. 25, 2018, the entire contents of the application shall be incorporated and stated in the present application by reference.

FIELD

The present invention relates to a car-loaded communication apparatus, an in-car communication system, a communication method and a program.

BACKGROUND

Patent Literatures 1 to 4 disclose various techniques related to communication networks. For example, Patent Literature (PTL) 1 discloses a technique of setting a packet transfer path so as to minimize power consumption of an entire network. Also, PTL 2 describes that in case where a power source is a rechargeable type or a battery type as a source node for relaying communication, when a path is selected only by a remaining power of the source node, the battery type source node is selected; power is consumed; and an operation time of an entire network is shortened.

In recent years, research and development of in-car network has been actively conducted. A standard such as CAN (Controller Area Network) is used as a standard for constructing a network in a car.

[PTL 1] JP2014-036423 A
[PTL 2] JP2012-129780 A
[PTL 3] JP2008-219599 A
[PTL 4] JP2007-150927 A

SUMMARY

The disclosures of the above-mentioned citations are incorporated herein by reference. The following analyses are given by the present inventors.

Car specific technologies such as CAN have been used for in-car networks. However, since in recent years, the amount of data handled in a car has increased, and it is necessary to connect to an external network such as internet, introduction of a proven technology in consumer technology as disclosed in PTLs 1 to 4 is under consideration. In other words, studies are underway to introduce ICT (Information and Communication Technology) into cars, ICT having compatibility with Internet-related technologies and having practical results in consumer technology.

On the other hand, since a technology related to cars may be related to human life, it is difficult to merely apply simple consumer technology to the in-car network.

Here, a communication technique assuming a normal communication infrastructure (communication infrastructure for consumer technology) will be described. In a normal communication infrastructure, it is not a rare case where there are a plurality of routes to reach a destination node. In such a case, in a normal communication technique, when the communication route (packet transfer path) of a certain flow is determined, the number of relay nodes (the number of hops) and the line speed for connecting between the nodes are digitized. Then, optimal route selection is realized by using the digitized information (the number of hops, the line speed) as indexes (metrics).

Figure 8:
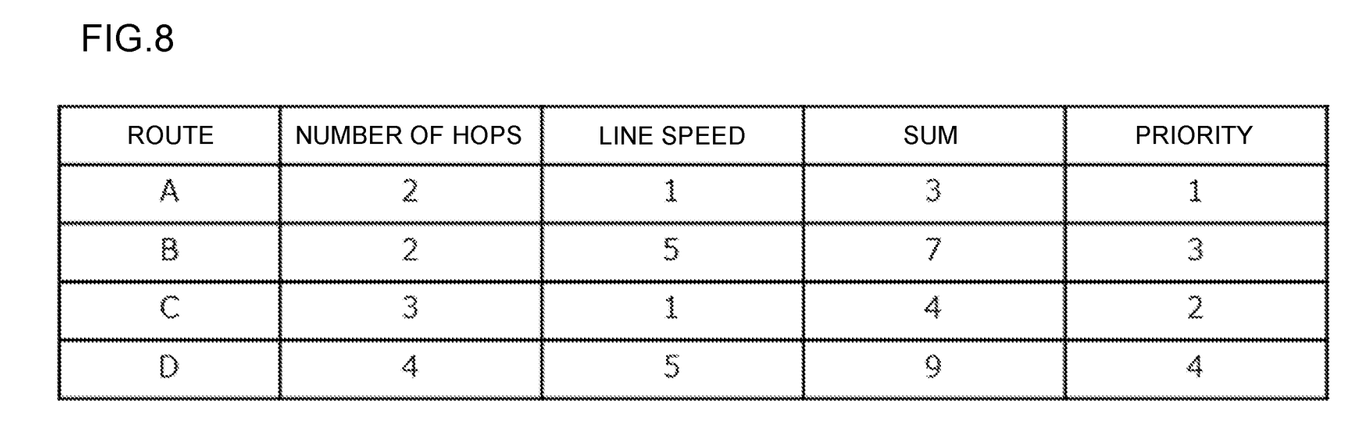
FIG. 8 is a diagram for explaining a technology used in a communication network different from the in-car network.

The above contents will be described with reference to FIG. 8. As shown in FIG. 8, it is assumed that there are four routes A, B, C, and D as candidates for realizing a specific flow. When determining a communication route of the specific flow, the number of hops from a transmission source of a packet to a destination (reception destination) of the packet, and a line speed connecting between relay nodes are digitized respectively for each route. For example, the above indexes are set so that the numerical value becomes smaller as a condition is better. After the above indexes are calculated, a sum of each parameters is calculated, and a transfer route of the packet is determined so that it is preferentially selected starting from a route having a smallest numerical value.

However, the method of determining the optimum route as described above cannot be applied to the car network. This is because a state of a car changes variously in a network (in-car network) that comprises a communication network inside. For example, as an engine stop, during stopping, during running and the like, the car state including a communication network inside changes variously. Yet more, not only the state inside the car but also a state outside the car changes variously. For example, as in rainy weather, during traffic jams, on highways and the like, the environment in which the car is placed also changes.

Although a flow communication route in the in-car network may be determined by the above number of hops and the line speed, it often occurs that the optimum communication route of the flow in the car changes depending on the state inside the car and the environment outside the car. In other words, in some flows that flow through the in-car network, there is also a flow which has a correlation with the car state and the environment in which the car is placed.

Therefore, upon determining an optimal communication route for a flow in the in-car network, it will not necessarily result in an optimal route for the flow flowing in the in-car network by merely determining the route based on the number of relay nodes and the line speed.

It is a main object of the present invention to provide a car-loaded communication apparatus, an in-car communication system, a communication method, and a program that contribute to determining an optimal communication route of a flow.

According to a first aspect of the present invention or a disclosure, a car-loaded communication apparatus is provided, the car-loaded communication apparatus comprising: an acquisition part that acquires car information related to a state of a car in which a communication network is constructed inside, or an environment in which the car is placed; and a selection part that selects a communication route of a flow accommodating a transmission packet(s) from a plurality of communication routes included in the communication network, based on: the car information; and communication route information related to a communication route(s) included in the communication network.

According to a second aspect of the present invention or a disclosure, an in-car communication system is provided, the in-car communication system comprising: a plurality of relay nodes; and a transmission node that transmits a packet (s) to a reception node via the relay node(s), wherein the transmission node comprises: an acquisition part that acquires car information related to a state of a car in which a communication network is constructed inside, or an environment in which the car is placed; and a selection part that selects a communication route of a flow accommodating a transmission packet(s) from a plurality of communication routes included in the communication network, based on: the car information; and communication route information related to a communication route(s) included in the communication network.

According to a third aspect of the present invention or a disclosure, a communication method is provided, in a car-loaded communication apparatus, the communication method comprising: acquiring car information related to a state of a car in which a communication network is constructed inside, or an environment in which the car is placed; and selecting a communication route of a flow accommodating a transmission packet(s) from a plurality of communication routes included in the communication network, based on: the car information; and communication route information related to a communication route(s) included in the communication network.

According to a fourth aspect of the present invention or a disclosure, a program is provided, the program causing a computer mounted in a car-loaded communication apparatus to execute: acquiring car information related to a state of a car in which a communication network is constructed inside, or an environment in which the car is placed; and selecting a communication route of a flow accommodating a transmission packet(s) from a plurality of communication routes included in the communication network, based on: the car information; and communication route information related to a communication route(s) included in the communication network.

The program can be recorded on a computer-readable storage medium. The storage medium may be non-transient such as a semiconductor memory, a hard disk, a magnetic recording medium, an optical recording medium, or the like. The present invention can also be embodied as a computer program product.

The program drives a processor according to predetermined steps or processes by: inputting to the computer apparatus from an input device or an external via a communication interface; and storing in a storage device, and the program can cause a display device to display a processing result thereof including an intermediate state if necessary, or can communicate with the external via a communication interface. As an example, a computer apparatus therefor comprises a processor, a storage device, an input device, a communication interface, and optionally a display device, which are typically connectable to each other by a bus.

According to each of the aspects of the present invention or the disclosure, a car-loaded communication apparatus, an in-car communication system, a communication method, and a program that contribute to determining an optimal communication route of a flow are provided.

PREFERRED MODES

First, an outline of one exemplary embodiment will be described. Please note that drawings reference number attached to this outline are added to respective elements for convenience as an example for facilitating understanding, and the description of this outline is not intended to limit in any way. Also, connecting lines between blocks in each figure include both bidirectional and unidirectional. Unidirectional arrows schematically show a flow of main signals (data), and do not exclude bidirectionally. Further, although omitting explicit in the circuit diagram, block diagram, internal configuration diagram, connection diagram and the like shown in the present disclosure, an input port and an output port exist at each of the input end and the output end of each connection line. The same applies for input/output interfaces.

Also, the following exemplary embodiments are merely examples, and do not limit the present invention.

A program is executed via a computer apparatus, and the computer apparatus comprises, for example, a processor, a storage device, an input device, a communication interface, and a display device as necessary, and the computer apparatus is configured to be able to communicate with an internal or external apparatus (including a computer) via a communication interface, regardless of whether wired or wireless.

Figure 1:
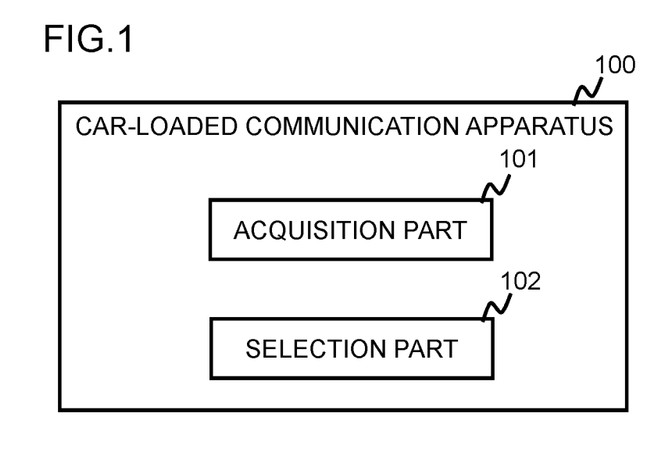
FIG. 1 is a diagram for explaining an outline of one exemplary embodiment.

A car-loaded communication apparatus 100 according to one exemplary embodiment comprises: an acquisition part 101; and a selection part 102 (see FIG. 1). The acquisition part 101 acquires car information related to a state of a car in which a communication network is constructed inside, or an environment in which the car is placed. The selection part 102 selects a communication route of a flow accommodating a transmission packet(s) from a plurality of communication routes included in the communication network, based on: the car information; and communication route information related to a communication route(s) included in the communication network.

The car-loaded communication apparatus 100 digitizes: the car state which is peculiar to the car; and the environment in which the car is placed, and uses them as a parameter(s) when selecting the communication route(s). As a result, drawbacks of communication technology for consumer, the communication technology not considering the car state and the like, are compensated (or supplemented), and such communication technology can be applied to the car. Also, safety and comfort of the car can be improved by selecting an optimum communication route according to the car state and the like.

Concrete exemplary embodiments will be described in more detail below with reference to the drawings. In each exemplary embodiment, the same reference numeral is given to the same configuration element, and an explanation thereof is omitted.

First Exemplary Embodiment

Below, a first exemplary embodiment will be described in more detail with reference to the drawings.

Figure 2:
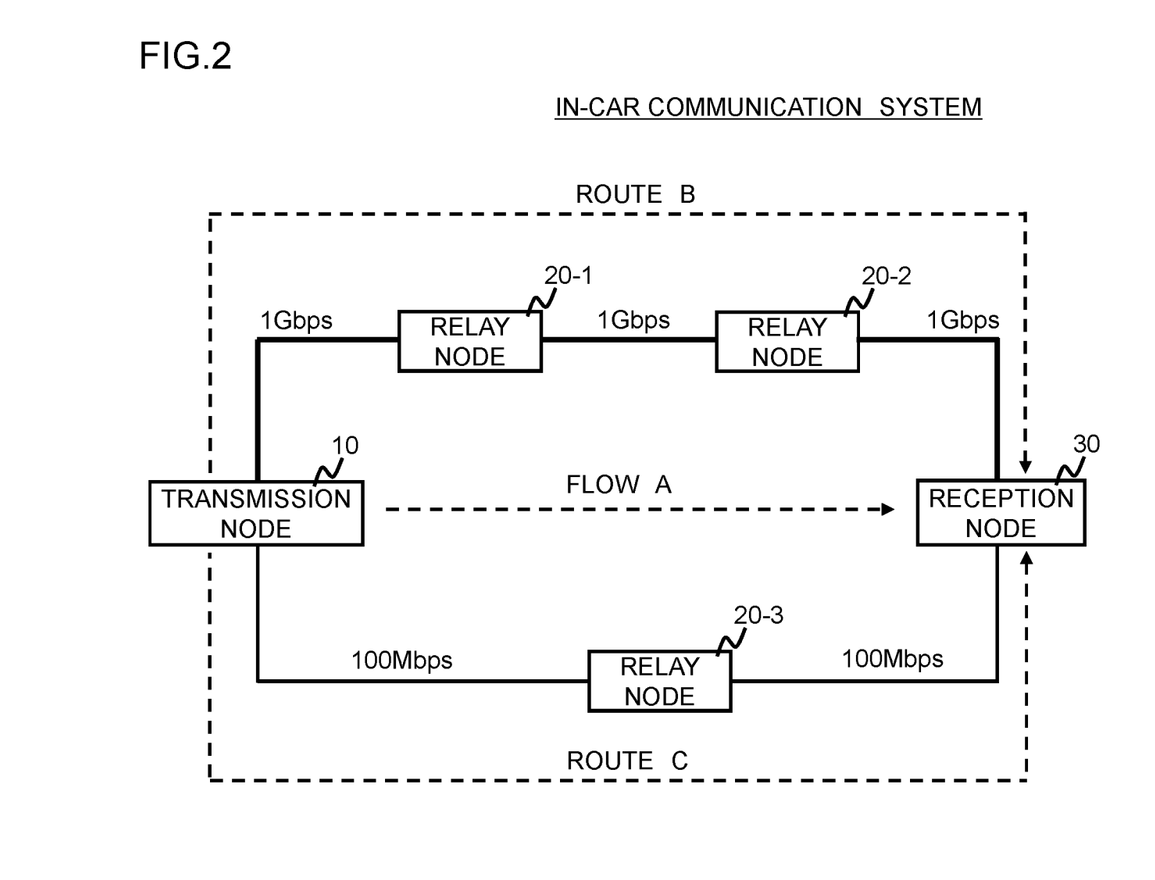
FIG. 2 is a diagram showing an example of a schematic configuration of an in-car communication system according to a first exemplary embodiment.

FIG. 2 is a diagram showing an example of a schematic configuration of an in-car communication system according to the first exemplary embodiment. Referring to FIG. 2, the in-car communication system is configured by including: a transmission node 10; relay nodes 20-1 to 20-3; and a reception node 30. The in-car communication system shown in FIG. 2 is a communication network configured inside the car.

It should be noted that the configuration shown in FIG. 2 is an example, and it is not intended to limit the configuration of the in-car communication network. For example, three or more relay nodes may be included. Also, in the following description, if there is no special reason for distinguishing the relay nodes 20-1 to 20-3, they will be simply expressed as "relay node 20".

The transmission node 10 and the reception node 30 are car-loaded communication apparatuses. The transmission node 10 or the like is, for example, an ECU (Engine Control Unit), and corresponds to a navigation system, a camera module or the like.

The relay node 20 is a communication apparatus having a packet transfer function called a hub or an L2 (layer 2) switch.

In FIG. 2, the transmission node 10 transmits a packet (data) to the reception node 30. The reception node 30 receives the packet transmitted by the transmission node 10. A flow from the transmission node 10 to the reception node 30 is expressed as flow A.

The three relay nodes 20 shown in FIG. 2 each comprise a function of transferring a received packet to the next stage (another port different from a receiving port of the packet).

As shown in FIG. 2, there are two routes that realize a flow from the transmission node 10 to the reception node 30. Concretely, the two routes are a route via the relay nodes 20-1 and 20-2 (hereinafter expressed as route B) and a route via the relay node 20-3 (hereinafter expressed as route C). That is, there are two routes according to the route B and the route C as candidates of the flow that accommodates the transmission packet from the transmission node 10.

The route B is connected by a line of 1 Gbps (gigabyte per second), and the route C is connected by a line of 100 Mbps (megabyte per second). It should be noted that the above line speeds (1 Gbps, 100 Mbps) are examples, and of course, it is not intended that the line speed of the route is limited.

Figure 3:
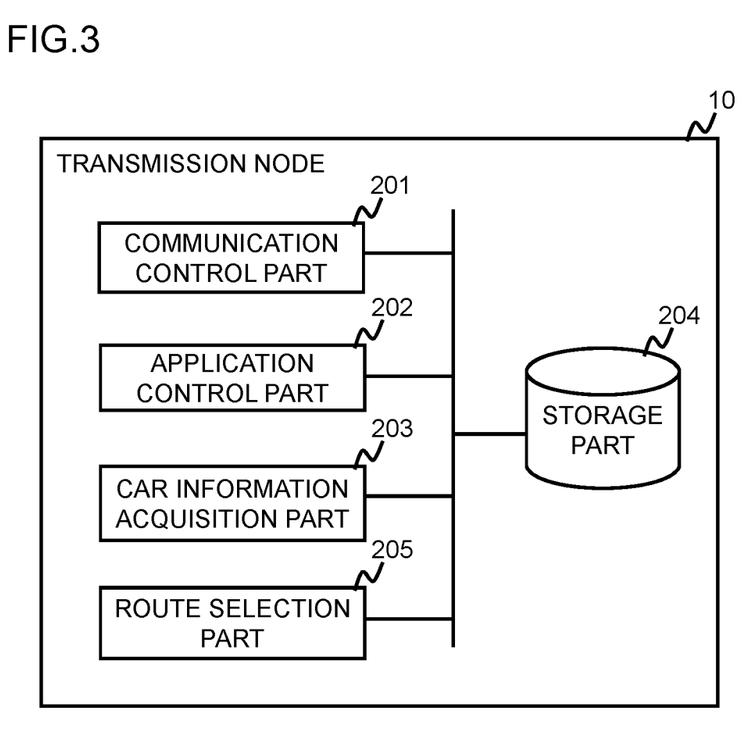
FIG. 3 is a diagram showing an example of a processing configuration of a transmission node according to the first exemplary embodiment.

FIG. 3 is a diagram showing an example of a processing configuration (processing module) of the transmission node 10. Referring to FIG. 3, the transmission node 10 comprises: a communication control part 201; an application control part 202; a car information acquisition part 203; a storage part 204; and a route selection part 205.

The communication control part 201 is a means that controls communication with another node (for example, the reception node 30). The communication control part 201 transmits a packet to the relay node 20 or receives a packet from the relay node 20.

The application control part 202 is a means that realizes an application (function) of the transmission node 10. For example, if the transmission node 10 is a navigation system, the application control part 202 provides a navigation function to a user. At that time, the application control part 202 creates data for transmitting to another node. For example, if the transmission node 10 is a navigation system and the reception node 30 is a camera module, the application control part 202 transmits data according to a video data transmission instruction or the like to the reception node 30.

The car information acquisition part 203 is a means that acquires information related to a state of a car or an environment in which the car is placed (hereinafter expressed as car information), the state and the environment building the communication network inside. For example, the car information acquisition part 203 acquires information related to a running state from an ECU (not shown) that controls the engine. Concretely, the car information acquisition part 203 acquires information such as the car is "stopping" and "in normal driving". Alternatively, the car information acquisition part 203 may determine that the car is in an "emergency" based on a failure information acquired from the ECU.

As the car information acquired by the car information acquisition part 203, there is an environment in which the car is placed. The car information acquisition part 203 acquires information related to the environment in which the car is placed based on information from a temperature sensor, a camera, or the like. For example, the car information acquisition part 203 determines whether the weather is fine or rainy (the environment in which the car is placed) by analyzing an image obtained from the camera.

The car information acquisition part 203 notifies the acquired car information to the route selection part 205.

The storage part 204 stores communication route information and digitized car information.

The communication route information is information related to a communication route included in the in-car communication network.

Figure 4A:
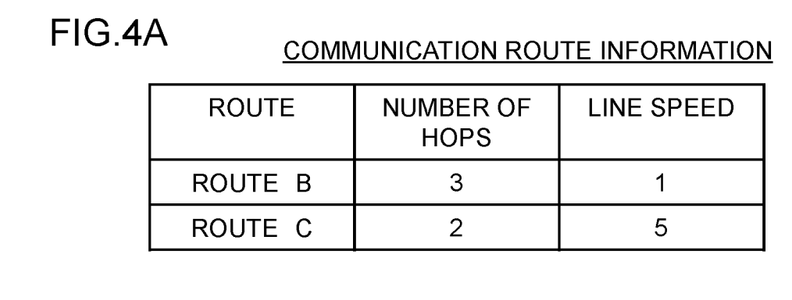
FIGS. 4A and 4B are diagrams showing an example of information stored in a storage part.

FIGS. 4A and 4B are diagrams showing an example of information stored in the storage part 204. Referring to FIG. 4A, the number of hops between the transmission node 10 and the reception node 30; and the digitized line speed are stored, for each communication route. The line speed is digitized by a predetermined rule so that the above two indexes are comparable (i.e. values of the indexes can be compared). Concretely, a small value is given to the line speed with high performance. For example, when a numerical value of "1" is given to the line speed of 1 Gbps, "5" is given to 100 Mbps which is a line speed of 1/10 thereof.

Figure 4B:
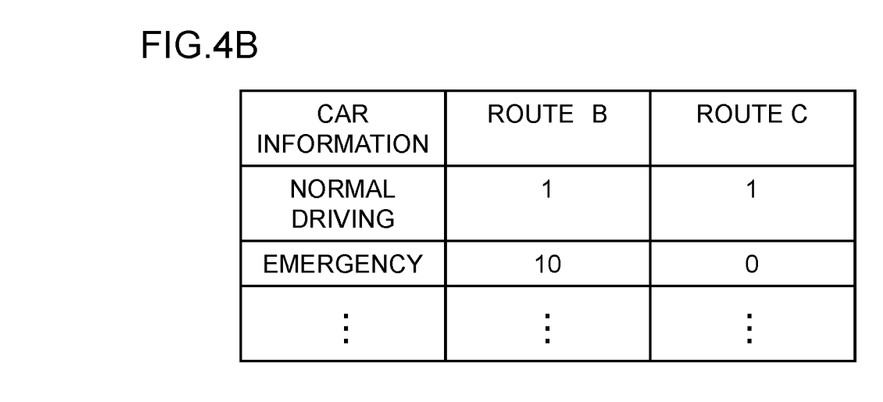

Also, referring to FIG. 4B, the car information and the numerical value given in advance to the car information are stored in association with each other, for each route. That is, a numerical value is given in advance to the assumed car information. For example, when checking the second line in FIG. 4B, if the car state is "emergency", the numerical value "10" is given to the route B and the numerical value "0" is given to the route C.

The information (communication route information, digitized car information) shown in FIGS. 4A and 4B are predetermined in advance by the car manufacturer or the like and is input to the transmission node 10.

The route selection part 205 is a means that selects a communication route of a flow accommodating a transmission packet(s) from among a plurality of communication routes included in the communication network, based on the car information (acquired car information, digitized car information) and the above communication route information. More concretely, the route selection part 205 selects a communication route of the flow, based on: the communication route information regarding the route stored in the storage part 204; the digitized car information; and the car information acquired from the car information acquisition part 203. For example, the route selection part 205 calculates a route evaluation value that evaluates each communication route. More concretely, the route selection part 205 selects a communication route accommodating the transmission packet, based on: number of relay nodes for each communication route (the number of hops); and a sum of numerical values given to the digitized line speed and the car information.

If the car state is at "normal driving", the route evaluation value related to the route B becomes "5" (3+1+1=5), and the route evaluation value related to the route C becomes "8" (2+5+1=8). If the car state changes and becomes "emergency", the route evaluation value of route B becomes "14", and the route evaluation value of route C becomes "7".

The route selection part 205 selects a route of a flow A from the transmission node 10 to the reception node 30 based on the route evaluation value. Concretely, the route selection part 205 selects a route whose evaluation value is the smallest.

For example, in the above example, if the car state is at "normal driving", the route B whose route evaluation value is the smallest is selected. On the other hand, if the car state is at "emergency", the route C whose route evaluation value is the smallest is selected.

The route selection part 205 notifies the selected route to the communication control part 201. The communication control part 201 that has received the notification transmits the packet to the selected route.

[Hardware Configuration]

Figure 5:
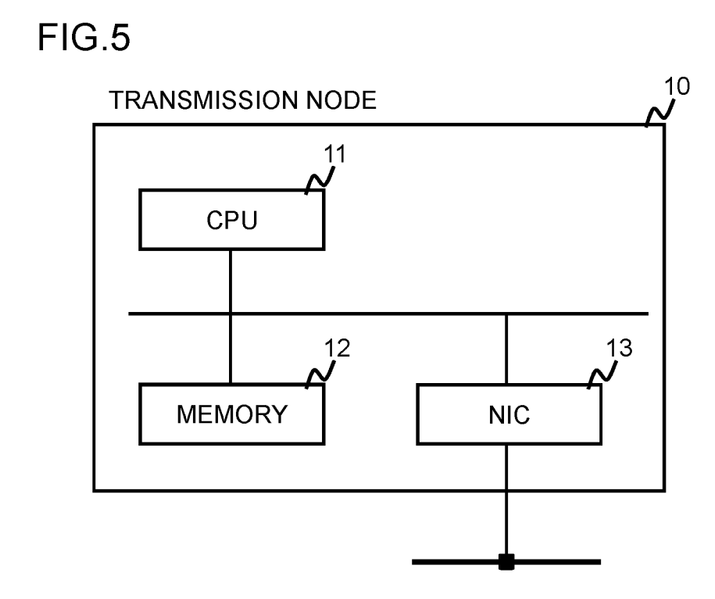
FIG. 5 is a diagram showing an example of a hardware configuration of a transmission node according to the first exemplary embodiment.

Next, a hardware of the transmission node 10 will be described. FIG. 5 is a diagram showing an example of the hardware configuration of the transmission node 10. The transmission node 10 comprises a configuration exemplarily shown in FIG. 5. For example, the transmission node 10 comprises a CPU (Central Processing Unit) 11, a memory 12, a NIC (Network Interface Card) 13 that is a communication means, and the like, which are mutually connected by an internal bus. The configuration shown in FIG. 5 is not intended to limit a hardware configuration of the transmission node 10. The transmission node 10 may also include hardware not shown.

The memory 12 is a RAM (Random Access Memory), a ROM (Read Only Memory), an HDD (Hard Disk Drive), or the like.

The NIC 13 is, for example, an interface card corresponding to Ethernet (registered trademark). Alternatively, if the in-car network is formulated by CAN, an interface card corresponding to CAN is used for the NIC 13.

Each of processing modules of the transmission node 10 described above is realized, for example, by executing a program stored in the memory 12 by the CPU 11. Also, the program can be updated by downloading via a network or using a storage medium storing the program. Further, the above processing module(s) may be realized by a semiconductor chip. That is, it is sufficient that there is a means that executes function(s) performed by the processing module(s) due to use of some hardware and/or software.

The processing configurations and hardware configurations of the relay node 20 and the reception node 30 are evident for one skilled in the art, so description thereof will be omitted.

[Operation of Transmission Node]

Figure 6:
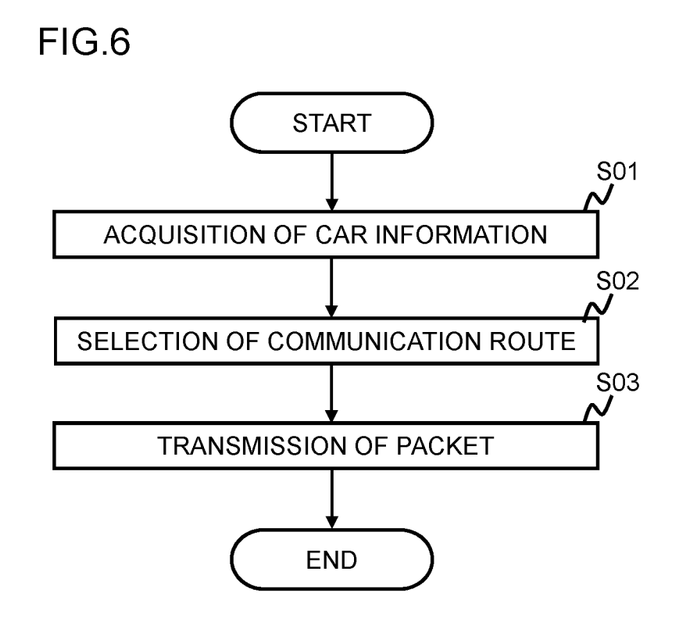
FIG. 6 is a flowchart showing an example of operation of a transmission node according to the first exemplary embodiment.

Next, operations of the transmission node 10 will be described with reference to the drawings. FIG. 6 is a flowchart showing an example of the operation of the transmission node 10 according to the first exemplary embodiment.

The transmission node 10 acquires car information (step S01). The transmission node 10 selects a communication route of the flow based on the communication route information and the car information (step S02). The transmission node 10 transmits the packet to the selected communication route (step S03).

As described above, the transmission node 10 according to the first exemplary embodiment considers the car state and the environment in which the car is placed, selects a communication route suitable for the state and environment, and transmits the packet. As a result, an optimal communication route of the flow is determined in the in-car communication network in which the car state and/or environment change(s).

For example, if the "emergency" mentioned above is due to a shortage of battery capacity in an electric car, an operation that minimizes power consumption is required. Although the number of hops of the above route B is 3, the route B is connected by a line of 1 Gbps. Therefore, the route B has a merit of being able to transmit a large amount of data when the battery is in a normal state. On the other hand, when the battery level (remaining power) becomes low for some reason, it is required to degenerate the functions and shift to a mode in which the essential function for safe driving is maintained. Also, a line speed of the route C is 100 Mbps, so the amount of handled data of the route C is limited as compared with a line of 1 Gbps, but the number of hops is 2, so the route C has a merit in terms of power consumption.

Alternatively, if the car state is at an emergency and the reception node 30 is a modem or the like for connecting to an external network, the route selection part 205 selects the route C having a small number of hops and can also respond so as to transmit emergency report data to the outside more reliably. Because the small number of hops means that the relay node 20 on the communication route has a low possibility in occurrence of failure.

In this way, the parameters such as power consumption and battery level that are not taken into consideration in the normal route setting can be reflected in the route selection, so the safety of electric cars or the like can be improved.

[Variations]

Figure 7:
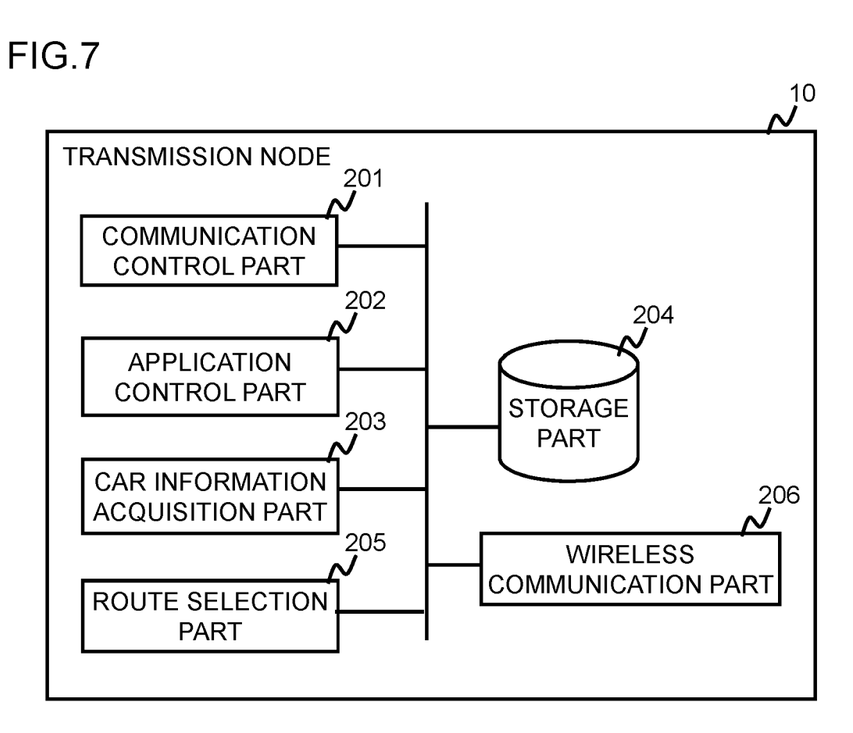
FIG. 7 is a diagram showing an example of another processing configuration of the transmission node.

It should be noted that the configuration and operation of the in-car communication system described in the above exemplary embodiments are exemplifications, and are not intended to limit the configuration and operation of the system. For example, the transmission node 10 may be a connected gateway that: manages the in-car network; comprises a wireless communication function; and connects the car and the cloud via a mobile network or the like. That is, the transmission node 10 may include the wireless communication part 206 (see FIG. 7).

If the transmission node 10 is a connected gateway, the parameters (parameters given to each car state and environment in which the car is placed) associated with the car information set in advance may be changed remotely from the cloud side.

Also, by connecting the car and the cloud server, if a state of a car that is not expected in advance appears, the connected gateway (transmission node 10) notifies such effect to the cloud and the parameters newly calculated in the cloud may be set remotely.

Although it is clear that there is the industrial applicability of the present invention from the above description, the present invention can be suitably applied to an automatic driving system, a driving support system, factory automation and the like.

The part or whole of the exemplary embodiments disclosed above can be described as the following appendixes (termed as "mode"), but the present inventions are not limited to them.
[Mode 1]
Mode 1 is the same as the car-loaded communication apparatus according to the first aspect described above.
[Mode 2]
The car-loaded communication apparatus preferably according to Mode 1, wherein the communication route information includes information related to number of relay nodes and line speed of each of a plurality of communication routes included in the communication network.
[Mode 3]
The car-loaded communication apparatus preferably according to Mode 2, wherein the line speed is digitized according to a predetermined rule.
[Mode 4]
The car-loaded communication apparatus preferably according to Mode 3, further comprising a storage part that stores the car information and a numerical value given in advance to the car information in association with each other.
[Mode 5]
The car-loaded communication apparatus preferably according to Mode 4, wherein the selection part selects a communication route accommodating the transmission packet, based on sum of: the number of relay nodes of each communication route; the digitized line speed; and the numerical value given to the car information.
[Mode 6]
The car-loaded communication apparatus preferably according to Mode 5, wherein the selection part selects the communication route having the smallest sum as a communication route accommodating the transmission packet.
[Mode 7]
The car-loaded communication apparatus preferably according to any one of Modes 4 to 6, further comprising a wireless communication part that accesses a cloud server via a mobile network, wherein the numerical value given to the car information is configured to be changeable from the cloud server.
[Mode 8]
The car-loaded communication apparatus preferably according to Mode 7, wherein when car information not assumed in advance appears, a numerical value newly calculated by the cloud server is set in the car information.
[Mode 9]
The car-loaded communication apparatus preferably according to Mode 8, wherein the car information not assumed in advance is notified to the cloud server.
[Mode 10]
Mode 10 is the same as the in-car communication system according to the second aspect described above.
[Mode 11]
Mode 11 is the same as the communication method according to the third aspect described above.
[Mode 12]
Mode 12 is the same as the program according to the fourth aspect described above.
The modes according to Modes 10 to 12 can be developed into any one of the modes of Modes 2 to 9 similarly to the mode of Mode 1.
It should be noted that the disclosures of each of the cited above Patent Literatures and the like are incorporated herein by reference. Modifications and adjustments of the exemplary embodiments or examples are possible within the framework of the entire disclosure (including the claims) of the present invention and based on the basic technical concepts thereof. Also, within the framework of the entire disclosure of the present invention, various combinations of various disclosed elements (including each element of each claim, each element of each exemplary embodiment or example, each element of each drawing, or the like), or selection (including partial deletion) is possible. That is, it goes without saying that the present invention includes various variations and modifications that can be made by one skilled in the art according to the entire disclosure including the claims and the technical concepts. In particular, with regard to the numerical range described here, any numerical value or small range included in the range should be interpreted as being concretely described even if not explicitly described.

REFERENCE SIGNS LIST

10 Transmission node
11 CPU (Central Processing Unit)
12 Memory
13 NIC (Network Interface Card)
20, 20-1 to 20-3 Relay node
30 Reception node
100 Car-loaded communication apparatus
101 Acquisition part
102 Selection part
201 Communication control part
202 Application control part
203 Car information acquisition part
204 Storage part
205 Route selection part
206 Wireless communication part

The invention claimed is:
1. An in-car communication system, comprising:
a plurality of relay nodes; and
a transmission node that transmits a packet(s) to a reception node via the relay node(s),
wherein the transmission node comprises:
a processor; and
a memory storing executable instructions that, when executed by the processor, causes the processor to perform as:
an acquisition part that acquires car information related to a state of a car in which a communication network is constructed inside, or an environment in which the car is placed; and
a selection part that selects a communication route of a flow accommodating a transmission packet(s) from a plurality of communication routes included in the communication network, based on: the car information; and communication route information related to a communication route(s) included in the communication network,
wherein the communication route information includes information related to number of relay nodes and line speed of each of a plurality of communication routes included in the communication network and
wherein the line speed is digitized according to a predetermined rule.
2. A non-transient computer readable recording medium storing a program, causing a computer mounted in a car-loaded communication apparatus to execute:
acquiring car information related to a state of a car in which a communication network is constructed inside, or an environment in which the car is placed; and selecting a communication route of a flow accommodating a transmission packet(s) from a plurality of communication routes included in the communication network, based on: the car information; and communication route information related to a communication route(s) included in the communication network, wherein the communication route information includes information related to number of relay nodes and line speed of each of a plurality of communication routes included in the communication network and wherein the line speed is digitized according to a predetermined rule.

3. A car-loaded communication apparatus, comprising:
a processor; and
a memory storing executable instructions that, when executed by the processor, causes the processor to perform as:
    an acquisition part that acquires car information related to a state of a car in which a communication network is constructed inside, or an environment in which the car is placed; and
    a selection part that selects a communication route of a flow accommodating a transmission packet(s) from a plurality of communication routes included in the communication network, based on: the car information; and communication route information related to a communication route(s) included in the communication network,
wherein the communication route information includes information related to number of relay nodes and line speed of each of a plurality of communication routes included in the communication network and
wherein the line speed is digitized according to a predetermined rule.

4. The car-loaded communication apparatus according to claim 3, further comprising a storage that stores the car information and a numerical value given in advance to the car information in association with each other.

5. The car-loaded communication apparatus according to claim 4, wherein the selection part selects a communication route accommodating the transmission packet(s), based on sum of: the number of relay nodes of each communication route; the digitized line speed; and the numerical value given to the car information.

6. The car-loaded communication apparatus according to claim 5, wherein the selection part selects the communication route having a smallest sum as a communication route accommodating the transmission packet(s).

7. The car-loaded communication apparatus according to claim 6, wherein the processor further performs as a wireless communication part that accesses a cloud server via a mobile network,
wherein the numerical value given to the car information is configured to be changeable from the cloud server.

8. The car-loaded communication apparatus according to claim 7, wherein when car information not assumed in advance appears, a numerical value newly calculated by the cloud server is set in the car information.

9. The car-loaded communication apparatus according to claim 8, wherein the car information not assumed in advance is notified to the cloud server.

10. The car-loaded communication apparatus according to claim 4, wherein the processor further performs as a wireless communication part that accesses a cloud server via a mobile network,
wherein the numerical value given to the car information is configured to be changeable from the cloud server.

11. The car-loaded communication apparatus according to claim 10, wherein when car information not assumed in advance appears, a numerical value newly calculated by the cloud server is set in the car information.

12. The car-loaded communication apparatus according to claim 11, wherein the car information not assumed in advance is notified to the cloud server.

13. The car-loaded communication apparatus according to claim 5, wherein the processor further performs as a wireless communication part that accesses a cloud server via a mobile network,
wherein the numerical value given to the car information is configured to be changeable from the cloud server.

14. The car-loaded communication apparatus according to claim 13, wherein when car information not assumed in advance appears, a numerical value newly calculated by the cloud server is set in the car information.

15. The car-loaded communication apparatus according to claim 14, wherein the car information not assumed in advance is notified to the cloud server.

16. A communication method, in a car-loaded communication apparatus, comprising:
    acquiring car information related to a state of a car in which a communication network is constructed inside, or an environment in which the car is placed; and
    selecting a communication route of a flow accommodating a transmission packet(s) from a plurality of communication routes included in the communication network, based on: the car information; and communication route information related to a communication route(s) included in the communication network,
wherein the communication route information includes information related to number of relay nodes and line speed of each of a plurality of communication routes included in the communication network and
wherein the line speed is digitized according to a predetermined rule.

17. The communication method according to claim 16, wherein the communication route information includes information related to number of relay nodes and line speed of each of a plurality of communication routes included in the communication network.

18. The communication method according to claim 17, wherein the line speed is digitized according to a predetermined rule.

* * * * *